United States Patent [19]

Holloway et al.

[11] 3,898,094

[45] Aug. 5, 1975

[54] HIGH TEMPERATURE ADHESIVE-SEALANT COMPOSITION

[75] Inventors: John G. Holloway, Oakmont; Herbert W. Barch, Natrona Heights; Dennis M. Fahey, Aspinwall, all of Pa.

[73] Assignee: PPG Industries, Inc., Pittsburgh, Pa.

[22] Filed: Aug. 20, 1973

[21] Appl. No.: 389,752

[52] U.S. Cl. .............................................. 106/104
[51] Int. Cl. ............................................. C04b 7/32
[58] Field of Search ...................... 106/90, 314, 104

[56] References Cited
UNITED STATES PATENTS
3,511,314   5/1970   Scott et al ........................... 106/314

Primary Examiner—J. Poer
Attorney, Agent, or Firm—Robert DeMajistre

[57] ABSTRACT

Novel adhesive-sealant compositions useful for bonding metal and/or glass surfaces are disclosed. These adhesive-sealant compositions are comprised of an aluminous cement and the reaction product of a tetracarboxylic dianhydride or a tricarboxylic monoanhydride and a dihydrazine, dihydrazide or aromatic diamine. The adhesive sealant is capable of withstanding surface temperatures of up to 1,000°F. without loss of adhesive or sealing properties.

7 Claims, No Drawings

HIGH TEMPERATURE ADHESIVE-SEALANT COMPOSITION

Prior Art

This invention relates to adhesive - sealant compositions useful for bonding and sealing metal and/or glass surfaces which are subsequently exposed to temperatures of up to 1,000°F.

An adhesive bonding agent is generally characterized as a material capable of bonding separate articles together by adhering to the surfaces of both articles.

The selection of an adhesive bonding agent for a particular use is governed by the chemical and physical properties of the adhesive bonding agent composition and the chemical and physical properties of the surfaces of the articles to be bonded. Some of the chemical and physical properties to be considered when an adhesive bonding agent is selected are the affinity of the surfaces to be bonded to the adhesive bonding agent, the ability of the adhesive bonding agent to adequately wet the surface to be bonded, the ability of the adhesive bonding agent to be placed in intimate contact with the surface to be bonded, the cohesive strength of the adhesive bonding agent itself and the chemical reactivity of the adhesive agent with the surface to be bonded.

Hence, the degree of difficulty in selecting or producing an adhesive bonding agent for adhering a plurality of surfaces to each other is directly proportional to the diversity of composition of surfaces to be bonded and the bonding characteristics of the surfaces themselves.

Generally, adhesive bonding agents are organic polymers having functionality which is adapted to the surfaces to be bonded. Organic polymers are usually employed due to their wide degree of variation in chemical and physical properties. However, when surface temperatures are greater than 300°F., organic polymers binding surfaces to each other begin to decompose and the adhesive and cohesive properties of the bonding agent are destroyed.

Therefore, in order to bond articles which are to be subjected to elevated temperatures, i.e., greater than 300°F., inorganic adhesive bonding agents may be employed. Common inorganic high temperature bonding agents are the cements such as the aluminous and siliceous cements. However, aluminous and siliceous cements have generally only been used to bind concrete block, refractory bricks and like inorganic, porous mineral compositions which are to be exposed to elevated temperatures. Hence, an adhesive bonding agent capable of withstanding elevated temperatures for metal, glass and other nonporous products is desired.

In addition to the bonding characteristics of adhesive bonding agents, many uses for such agents require sealing characteristics. Thus, the bonding agent must form a continuous mass between the bonded articles which is minimally permeable, if not impermeable to the flow of gases and liquids through the adhesive bonding agent portion of the bonded article. Therefore, adhesive bonding agents having sealing characteristics are generally designated as adhesive-sealants.

In order for an adhesive-sealant to be effective at elevated temperatures, it must not lose either its adhesive, cohesive or sealing characteristics when exposed to high temperature.

Hence, there has been great difficulty in the art in arriving at adhesive - sealant compositions capable of withstanding surface temperatures in excess of 300°F. for bonding and sealing smooth surfaced articles.

THE INVENTION

The instant invention provides an adhesive - sealant composition capable of withstanding surface temperatures up to 1,000°F. for bonding smooth surfaces.

Further, the instant invention provides an adhesive-sealant with the necessary adhesive properties to bind a diversity of surfaces to each other.

In addition, the adhesive - sealant composition of the instant invention is substantially chemically inert, thereby not causing deterioration of the bonded surfaces when subjected to elevated temperatures.

Still further, the instant invention provides an adhesive-sealant which is impermeable to gases and liquids at elevated temperatures thus providing a seal between the surfaces to be bonded.

The hereinbefore-mentioned advantages and other advantages will become apparent with the further disclosure of the invention.

The instant invention briefly involves a high temperature, heat-hardenable, adhesive - sealant composition whose solids comprise an aluminous cement, typically 75 to 97 percent by weight of the composition, and containing a substantial amount as $Al_2O_3$, and 3 to 25 percent by weight of the composition of an organic compound selected from the group consisting essentially of a polyamic acid, the reaction product of a tetracarboxylic dianhydride or a tricarboxylic monoanhydride and a dihydrazine or a dihydrazide.

The aluminous cement of the adhesive - sealant composition contains a substantial amount, preferably 78 to 99 percent by weight, as $Al_2O_3$ to maintain structural, adhesive and sealing characteristics at 1,000°F. In addition, the $Al_2O_3$ provides chemical inertness to the adhesive composition to hinder deterioration of the bonded substrates at elevated temperatures.

Other metal oxides, at a level of 1 to 22 percent by weight, such as $SiO_2$, $Fe_2O_3$, CaO, $TiO_2$, NaO, MnO, MgO, $ZrO_2$ and like materials can be added to the aluminous cement to provide additional desirable properties such as higher or lower maturing temperatures, additional strength, variation in thermal conductivity, variation in bulk density and like properties selected for the particular application for which the adhesive-sealant is to be used a level of 12 percent as $SiO_2$ has been found to be useful in the practice of the invention.

Care should be taken that the oxides other than $Al_2O_3$ are essentially inert to the substrates to be bonded at the surface temperatures of the bonded articles. For example, more than about 1 percent by weight of $Na_2O$ incorporated into the adhesive - sealant composition would be detrimental to substrates reactive to $Na_2O$ such as glass or glass fibers. The $Na_2O$ chemically attacks the glass thereby causing erosion of the glass and a failure in the adhesive-sealant's cohesive and adhesive strength.

As previously disclosed, the organic material can be an aromatic polyamic acid. Such polyamic acids contemplated in the practice of the instant invention are those derived from the reaction of an aromatic tetracarboxylic dianhydride and an aromatic diamine. This reaction product can be represented by the structural formula:

(I) 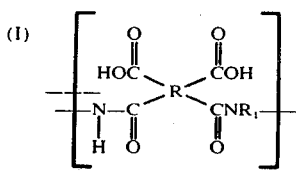

wherein R is an aromatic tetravalent organic radical. Examples of typical aromatic tetravalent organic radicals are aromatic tetravalent radicals of the structure:

and the like.

$R_1$ is a divalent aromatic organic radical. Examples of such divalent aromatic radicals are aromatic divalent organic radicals such as 4,4' diphenylene propane; 4,4' diphenylene methane; 4,4' diphenylene sulfide; 3,3' diphenylene sulfone; 4,4' diphenylene sulfone; 4,4' diphenylene ether; 1,5 naphthalene; metaphenylene; paraphenalene; 3,3' dimethyl, 4,4' biphenylene; 1-isopropyl, 2,4-methaphenylene; metaxylylene; paraxylylene and the like.

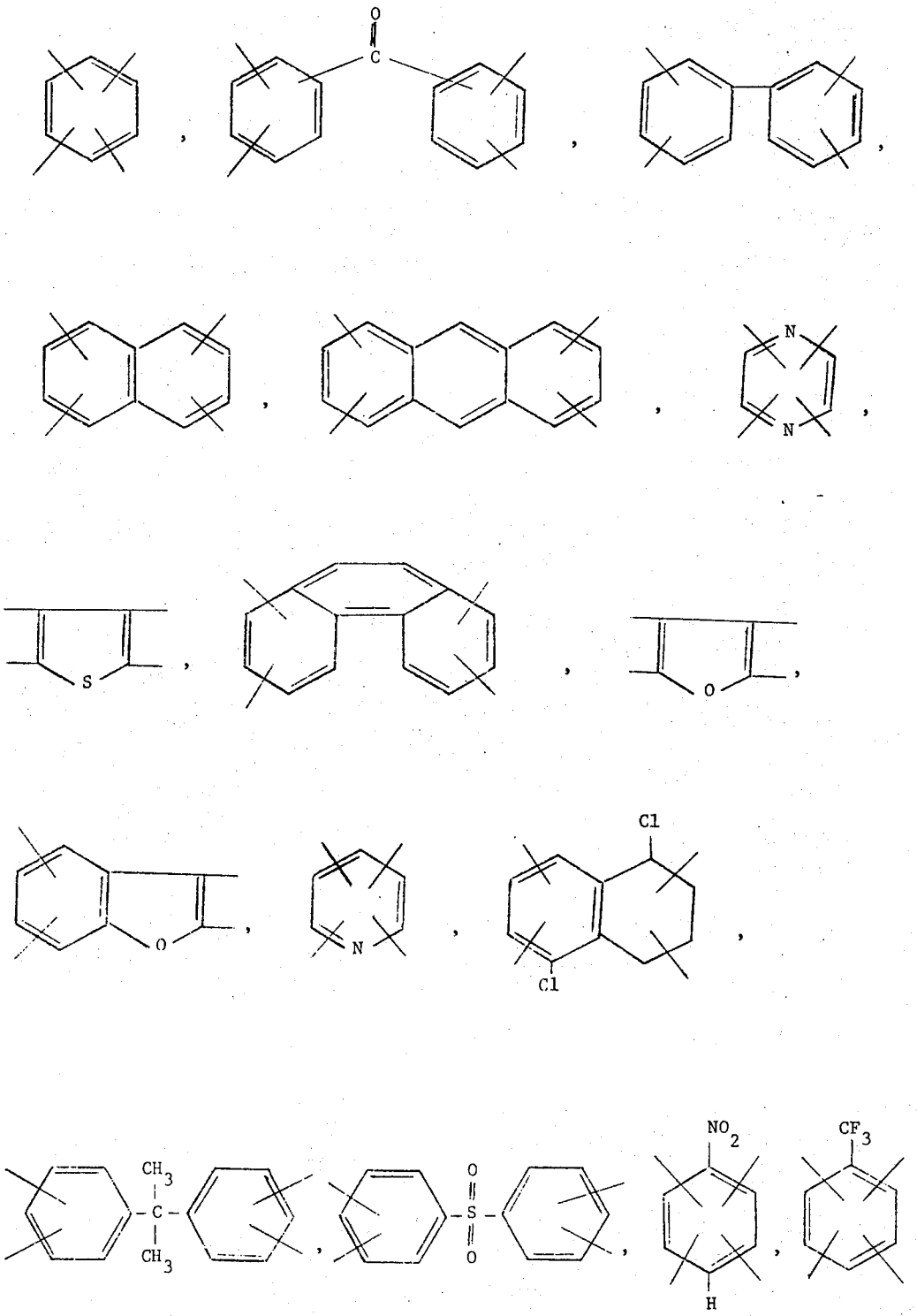

The hydrazine or hydrazide tetracarboxylic dianhydride reaction products of the instant invention can be represented by the structural formula:

(II)

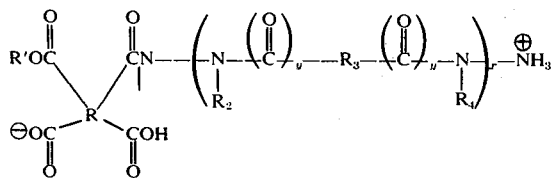

wherein R is a tetravalent aromatic radical as previously described, R' is a monovalent alkyl, cycloalkyl or alkenyl radical having 1 to 20 carbon atoms.

$R_2$ and $R_3$ are selected from the group consisting of monovalent alkyl, aryl, arylalkyl, cycloalkyl, heterocycloalkyl and hydrogeno radicals and isomers thereof.

$R_3$ is a divalent organic radical having at least two carbon atoms. Examples of said divalent organic radicals are, but are not limited to, the aromatic divalent organic radicals such as:

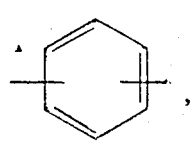 , 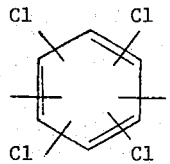 , 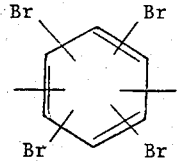 ,

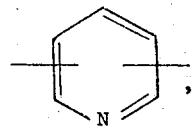 , 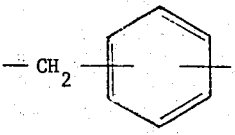 , 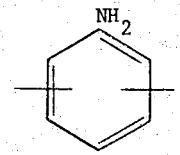 , and the like, and the divalent organic aliphatic radicals and cycloaliphatic radicals such as

wherein n is 2 to 34,

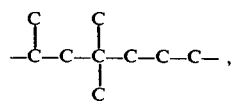 , , ,

 , ,

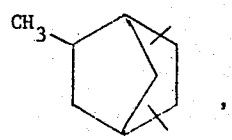 , ,

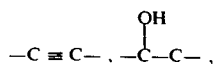 , and the like.

An additional product as a result of the reaction of the tetracarboxylic dianhydride and a hydrazine or a hydrazide that can be used in the practice of the instant invention can be represented by the structural formula:

(III)

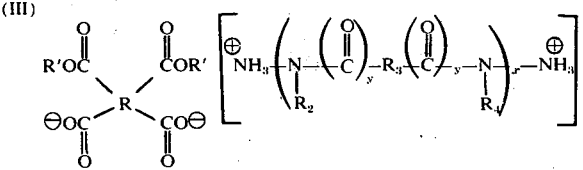

wherein R', R, $R_2$, $R_3$, $R_4$, x and y are as previously noted.

The reaction product of tricarboxylic monoanhydride and hydrazine or hydrazide useful in the practice of the instant invention can be represented by the structural formula:

(IV)

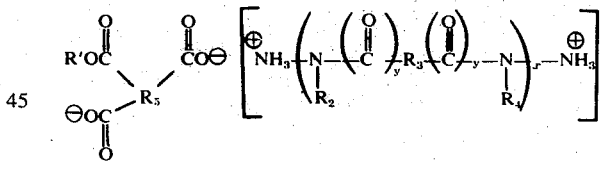

wherein $R_5$ is a trivalent aromatic organic radical. Examples of such trivalent aromatic organic radicals are, but are not limited to:

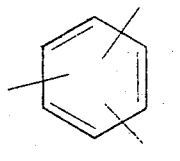 , 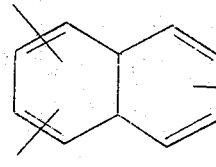 ,

 ,

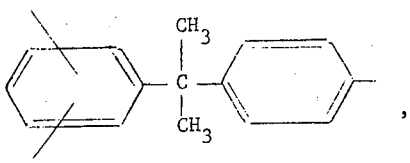

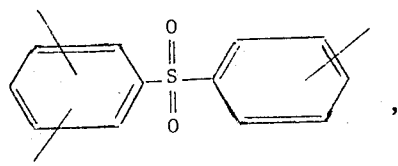

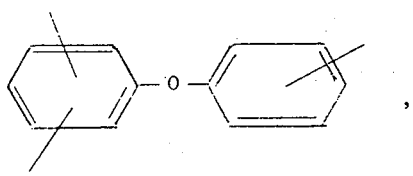

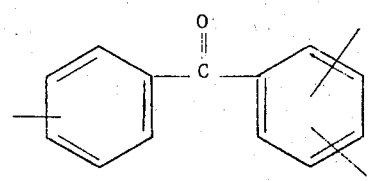

and the like and R', $R_2$, $R_3$, $R_4$, $x$ and $y$ are as previously described.

In addition, another reaction product of tricarboxylic anhydride and a hydrazine or hydrazide useful in the practice of the instant invention can be represented by the structural formula:

(V)

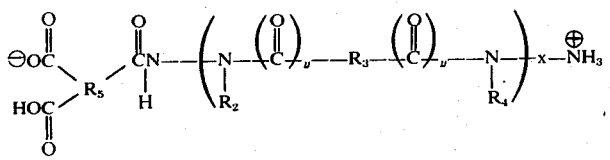

wherein R, $R_2$, $R_3$, $R_4$, $x$ and $y$ are as previously described.

The polyamic acids are prepared by any suitable method. In general, they are prepared by reacting a tetracarboxylic dianhydride in a 1 to 1 molar ratio with an aromatic diamine. This reaction is preferably performed in the presence of a polar solvent. Examples of such solvents useful in dissolving the tetracarboxylic acid and diamine are, but not limited to, dimethyl sulfone, dimethyl sulfoxide, dimethyl formamide, m-pyrol and the like. The reaction can be accomplished at room temperature or at elevated temperatures, up to about 200°F. If temperatures are employed above about 200°F., polyimide formation may occur thereby producing a highly insoluble product which is no longer useful in the practice of the instant invention. Other methods of forming the polyamic acid known to those skilled in the art may be used, however the aforementioned method is the preferable method.

The tetracarboxylic dianhydride, hydrazine or hydrazide reaction product of formula II is produced by admixing 1 mole of tetracarboxylic dianhydride with a suitable solvent, adding 1 mole of a monofunctional alcohol to produce an ester acid anhydride which can be represented by the structural formula:

(VI)

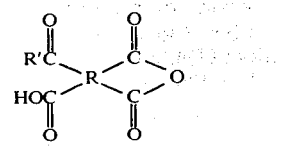

wherein R and R' are as previously described.

Subsequently, this ester-acid-anhydride is reacted with a hydrazine or hydrazide to produce the polysalt represented by structural formula II. The reaction mixture should be kept below about 40°C. Elsewise, the R'O-group will be displaced by the terminal-$NH_2$ group and polymerization will occur, thereby producing an insoluble product which is no longer useful for mixing with the aluminous cement to form the adhesive-sealant composition.

The tetracarboxylic dianhydride hydrazine or hydrazide reaction product represented by structural formula III is produced by admixing 1 mole of tetracarboxylic dianhydride and 2 moles of monofunctional alcohol to produce a diester diacid to which is subsequently added a hydrazine or hydrazide, thus forming the polysalt of formula III. This salt formation should be controlled at below 40°C. or a terminal-$NH_2$ group will displace an —OR group on the tetracarboxylic ester and thereby produce a polysalt as represented by structural formula II.

The tricarboxylic dianhydride hydrazine or hydrazide reaction product represented by structural formula IV is produced by reacting a tricarboxylic anhydride with a monofunctional alcohol in the presence of a dissolving solvent to form the monoester dicarboxylic acid which is subsequently reacted with a hydrazine or hydrazide at preferably below 40°C. to form the polysalt of formula IV.

In addition, another tricarboxylic anhydride hydrazine or hydrazide reaction product can be formed by the reaction of a monofunctional alcohol and the tricarboxylic anhydride to form an ester diacid which is subsequently reacted with a hydrazine or hydrazide at about 40°C. to form a polysalt of the structural formula V. In this reaction a terminal —$NH_2$ group displaces the —OR group of the ester, thus forming the aforementioned polysalt. In addition, this polysalt may be formed by reacting the tricarboxylic anhydride directly with the hydrazine or hydrazide to form the salt of formula V. This reaction must also be conducted in a solvent and may be performed at room temperature or higher than room temperature up to about 200°F. above which the polysalt ring will close and condense to an imide-like structure.

In addition to the cement and polyamic acid or polysalt constituents of the adhesive-sealant, reinforcing agents can be added to the adhesive-sealant composition to provide additional strength to the adhesive bond produced thereby. Of particular utility as a reinforcing agent is chopped glass fiber strand incorporated into the adhesive - sealant composition to the extent of about 1 to 10 percent preferably 6 percent by weight of the composition. These glass fibers provide additional strength and tenacity to the adhesive - sealant composition. Other appropriate known reinforcing agents may be used to provide additional improved structural characteristics to the adhesive bonding composition.

Aqueous nitrogeneous base solutions such as amine solutions and ammonia solutions can be used to provide increased water solubility to the polyamic acids and the polysalts of the instant invention. These nitrogeneous base solutions can substantially reduce the viscosity of the polyamic acids or polysalts to a degree desirable for adequate handling for application of the adhesive - sealant composition to the substrates.

Additionally, thixotropic agents such as active silicas and bentonite or organic polymers can be added to the adhesive - sealant composition of the instant invention to provide prolonged homogeneity between the cement and polyamic acid or polysalt. Organic polymers which impart thixotropic properties to the adhesive sealant mixture are, but not limited to, 2-hydroxyethyl cellulose, cellulose acetate butyrate, and the like. However, the amount of these organic polymers should be limited to below about 1 percent by weight, otherwise, on heating to above about 300°F., decomposition of these polymers will occur and substantial degradation of the adhesive - sealant properties of the bonding composition will occur. When an inorganic - thixotropic agent is used such as an active silica, amounts greater than 1 percent may be used due to lack of decomposition of these thixotropic agents at elevated temperatures.

The adhesive - sealant composition of the instant invention is formed by charging, to a suitable size container such as a beaker or the like, the polyamic acid or the tetracarboxylic dianhydride hydrazine or hydrazide reaction product, or the tricarboxylic acid monoanhydride hydrazine or hydrazide reaction product and subsequently adding the concentrated aqueous nitrogeneous base solution thereto. The above mixture is stirred with either manual or mechanical agitation until homogeneous, thus forming a polyamic salt. A small portion of water is then added to the above salt solution to reduce the solution viscosity to a desirable level. The aluminous cement is then added to the solution and agitated either mechanically or manually until homogeneous. After homogeneity is obtained, the thixotropic agent and the reinforcing agent can then be added, if desired. Finally, additional water may be added to the adhesive - sealant composition to impart a workable consistency to the mixture. The adhesive-sealant composition is then applied to the desired substrates and cured at ambient temperature to about 500°F. for about 15 to 180 minutes thus removing water, any organic solvent, and other volatiles contained therein. The sample is then heated to at least 600°F. for at least one-half hour to enact curing of the cement and organic polymer. The bonded article is thus imparted with cohesive and adhesive strength capable of withstanding up to 1,000°F. without appreciable loss in mechanical stability.

Other sequences of addition of the components of the adhesive - sealant compositions may be used, however the above method is the preferred method.

DESCRIPTION OF THE PREFERRED EMBODIMENTS

The following examples are illustrative of the methods and compositions of the instant invention.

EXAMPLE I

To a 500 milliliter beaker was charged 36 grams of a 60 percent weight solids polyamic acid solution (Skybond 700) consisting of the reaction product of benzophenone tetracarboxylic dianhydride and metaphenylene diamine in an m-pyrrole-ethanol solvent. Six grams of 28 percent aqueous $NH_4OH$ was added to the Skybond 700 with manual agitation and a small amount of water was added to the solution to impart a viscosity reduction. Two hundred twenty-five grams of an aluminous cement having 99 percent by weight as $Al_2O_3$, 0.7 percent by weight as $SiO_2$, 0.1 percent by weight as $Fe_2O_3$, 0.1 percent by weight as $CaO$, and 0.3 percent by weight as $Na_2O$ was added and mixed with manual agitation until homogeneous. Three grams of active silica was added to the above adhesive - sealant composition and water sufficient to bring the total added water content of the adhesive - sealant composition to 70 grams.

A rectangular sheet of convoluted glass fiber paper was disposed into a cylindrical form and the two edges defining the length of the rectangle were joined by the adhesive - sealant composition. The convoluted glass fiber cylindrical article was placed in a forced air oven at 400°F. for 3 hours to dry the adhesive-sealant, and then the article was cooled to room temperature. The glass fiber paper article was placed in an oven at 800°F. for 3 hours, and after cooling to room temperature the joint of the sealed glass fiber paper showed no deterioration of the glass and excellent cohesive and adhesive strength was observed.

EXAMPLE II

The adhesive - sealant composition of Example I was repeated and 340 grams of this composition was poured into a stainless steel end cap having the configuration of a circular channel defining a central aperture of 4 inches in diameter. The channel was 2 inches in width and ¼ inch in depth, the width was sufficient to accommodate the convolutions of the glass fiber paper cylinder of Example I and the depth was sufficient to support the glass fiber paper cylinder of Example I. The end cap was filled to the top edge of the channel with the adhesive - sealant composition and the circular edge of the glass fiber paper cylinder of Example I was placed therein. The above article was placed in a forced air oven at 450°F. for 1 hour to dry the adhesive-sealant. After the article had cooled to room temperature the above procedure was repeated using another end cap on the opposite end of the convoluted glass fiber paper cylinder. This filtration element was placed in a suitable housing and was mounted in a diesel exhaust system to filter carbonaceous exhaust particulates. The filtration unit ran for 10 hours at about 700°F. without any sign of deterioration of the glass fiber to glass fiber seals or the glass fiber to stainless steel seals. No deterioration of the glass or the steel was observed at the bonding sites.

EXAMPLE III

An adhesive-sealant composed of 9 grams of Skybond 700, 2 grams of 28 percent aqueous $NH_4OH$, 75 grams of the aluminous cement of Example I, 5 grams of MgO, and 2 grams of glass fiber chopped strand, was formulated in accordance with the procedure of Example I. Two samples of stainless steel were joined by means of the above adhesive - sealant composition and the article was allowed to air dry at room temperature for 1 hour and then subsequently heated to 170°F. for 1 hour. After the article cooled to room temperature, it was again heated to 800°F. for 4 hours. After the article was cooled to ambient temperature, inspection showed excellent adhesive and cohesive strength and no observable attack of the metal substrate by the adhesive - sealant composition.

EXAMPLE IV

Solution A 484 grams of a solution composed of 46 grams of ethyl alcohol and 438 grams of N-methyl pyrrole was added to 322 grams of benzophenone tetracarboxylic dianhydride in a 1.5 liter beaker. The above mixture was heated on a steam bath until by visual observation the mixture appeared homogeneous. The mixture was heated for an additional ½ hour after this observation.

Solution B 69 grams of 85 percent hydrazine hydrate was added to 300 grams of N-methyl pyrrole in a beaker and agitated manually at ambient temperature (25°C.).

Polysalt formation

Solution A was added to Solution B while both were at room temperature. A 40°C. increase in temperature of the mixed solution was observed.

Adhesive - Sealant Composition 12 grams of the above polysalt solution was added to a solution consisting of 86 grams of water in a beaker manually agitated with 2 grams of 28 percent aqueous ammonium hydroxide until the mixture appeared homogeneous.

Seventy-five grams of the cement of Example I was added to 100 grams of the above polysalt solution. The adhesive - sealant composition was then applied to two pieces of stainless steel and the coated steel was contacted on the coated surfaces. The article was dried at 170°F. for 1 hour. After cooling to room temperature, the article was heated to 800°F. for 4 hours. When the sample was cooled to room temperature the adhered, sealed article had good adhesive and cohesive strength. No chemical attack to the adhesive - sealant composition of the metal was observed.

The adhesive - sealant composition of the instant invention can be used as a bonding and sealing agent providing structural adhesion between metals such as stainless steel, aluminum, zinc, copper, brass and the like and also to bond minerals such as asbestos, glass, ceramics and the like, or to bind the aforementioned metals and mineral compositions to each other.

The adhesive - sealant composition of the instant invention has found particular utility in binding glass fibers to metal supports where glass fibers in the form of cloth, mat or paper are to be used for the filtration of high temperature gases, such as automotive exhaust gases. The adhesive - sealant compositions of the instant invention provide the necessary structural stability to the glass fiber metal supported article so that it may withstand temperatures up to 1,000°F. while being able to undergo mechanical stresses and vibrations incident to the environment in which the filter is operated.

Although the present invention has been described with respect to certain specific details and embodiments thereof, it is not intended that such details act as limitations upon the scope of the invention except insofar as set forth in the accompanying claims.

We claim:
1. A heat hardenable adhesive sealant composition comprising:
   a. 75 to 95 percent by weight of a mixture of metal oxides having therein 78 to 99 percent as $Al_2O_3$ and
   b. 3 to 25 percent by weight of an organic compound selected from the group consisting of:
      i. the reaction product of an aromatic tetracarboxylic dianhydride and an aromatic diamine,
      ii. the reaction product of an aromatic tetracarboxylic dianhydride and a hydrazine,
      iii. the reaction product of an aromatic tetracarboxylic acid and a dihydrazide,
      iv. the reaction product of an aromatic tricarboxylic monoanhydride and an aromatic diamine,
      v. the reaction product of an aromatic tricarboxylic monoanhydride and a hydrazine, and
      vi. the reaction product of a tricarboxylic acid and a hydrazide,
   and said reaction products being reacted on a one to one molar basis.

2. The adhesive - sealant of claim 1 wherein the tetracarboxylic dianhydride is of the structural formula:

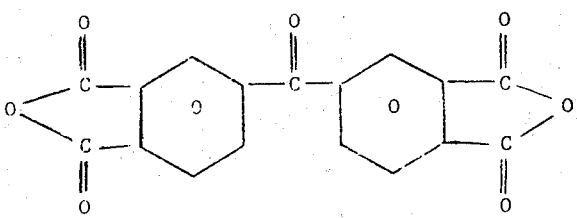

3. The adhesive - sealant composition of claim 1 wherein the diamine is of the structural formula:

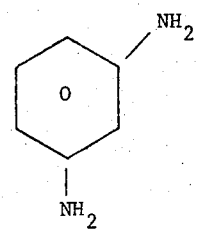

4. The adhesive - sealant of claim 1 wherein the tricarboxylic acid dianhydride is of the structural formula:

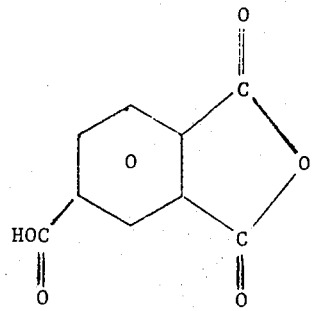

5. The adhesive - sealant composition of claim 1 wherein the mixtures of metal oxides has 99 percent by weight as $Al_2O_3$.

6. The adhesive - sealant of claim 1 wherein the mixture of metal oxides has 12 percent by weight as $SiO_2$.

7. The adhesive - sealant of claim 1 reinforced with 6 percent by weight of chopped glass fiber strand.

* * * * *